(12) United States Patent
Bhogal et al.

(10) Patent No.: US 9,141,637 B2
(45) Date of Patent: Sep. 22, 2015

(54) PREDICTIVE DATA MANAGEMENT IN A NETWORKED COMPUTING ENVIRONMENT

(71) Applicant: International Business Machines Corporation, Armonk, NY (US)

(72) Inventors: Kulvir S. Bhogal, Pflugerville, TX (US); Gregory J. Boss, Saginaw, MI (US); David B. Lection, Raleigh, NC (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/627,159

(22) Filed: Sep. 26, 2012

(65) Prior Publication Data

US 2014/0089449 A1    Mar. 27, 2014

(51) Int. Cl.
| | | |
|---|---|---|
| G06F 15/16 | (2006.01) | |
| G06F 15/167 | (2006.01) | |
| G06F 15/173 | (2006.01) | |
| G06F 17/30 | (2006.01) | |
| H04L 29/08 | (2006.01) | |

(52) U.S. Cl.
CPC .... *G06F 17/30194* (2013.01); *G06F 17/30082* (2013.01); *H04L 67/06* (2013.01); *H04L 67/1097* (2013.01); *H04L 67/18* (2013.01); *H04L 67/28* (2013.01)

(58) Field of Classification Search
CPC ................... G06F 17/30575; G06F 17/30174; G06F 17/30194; G06F 17/30345; G06F 3/0611; G06Q 10/109; H04L 67/325; H04L 67/16; H04W 52/0251

USPC ........ 709/201, 202, 213, 214, 215, 216, 217, 709/218, 219, 225
See application file for complete search history.

(56) References Cited

U.S. PATENT DOCUMENTS

| | | | | |
|---|---|---|---|---|
| 6,169,988 | B1* | 1/2001 | Asakura ........................ | 709/201 |
| 7,441,194 | B2* | 10/2008 | Vronay et al. ................ | 715/738 |
| 7,779,097 | B2* | 8/2010 | Lamkin et al. ................ | 709/223 |
| 7,978,653 | B2* | 7/2011 | Sasaki et al. .................. | 370/329 |
| 2003/0156138 | A1* | 8/2003 | Vronay et al. ................ | 345/772 |
| 2004/0210628 | A1* | 10/2004 | Inkinen et al. ................ | 709/201 |
| 2005/0022024 | A1* | 1/2005 | Hashimoto ................... | 713/201 |
| 2009/0082033 | A1* | 3/2009 | Sasaki et al. ................ | 455/456.1 |
| 2010/0115048 | A1* | 5/2010 | Scahill .......................... | 709/213 |
| 2010/0312809 | A1* | 12/2010 | Calder et al. ................. | 707/912 |
| 2011/0023048 | A1 | 1/2011 | Srinivasan | |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Edward Kim
(74) *Attorney, Agent, or Firm* — William E. Schiesser; Keohane & D'Alessandro PLLC; Hunter E. Webb

(57) ABSTRACT

An approach for managing file storage between local and remote storage locations in a networked computing environment (e.g., a cloud computing environment) is provided. In a typical embodiment, files/data may be tagged with metadata that associates the files/data with an event that indicates a date/time and a geographical destination of an intended use of the files. The files may then be transferred between local and remote storage (e.g., at the destination) based upon a set of predefined rules for transferring the files/data.

16 Claims, 6 Drawing Sheets

(56) References Cited

U.S. PATENT DOCUMENTS

| | | |
|---|---|---|
| 2011/0225451 A1 | 9/2011 | Leggette et al. |
| 2011/0258461 A1 | 10/2011 | Bates |
| 2012/0324041 A1* | 12/2012 | Gerber et al. ............. 709/217 |

OTHER PUBLICATIONS

Mell, P. et al., "The NIST Definition of Cloud Computing", National Institute of Standards and Technology, Information Technology Laboratory, Vers. 15, Oct. 7, 2009, 2 pgs.

"Enterprise Cloud Storage", Nirvanix Public Hybrid Private Clouds, http://www.nirvanix.com, 2 pages. Copyright 2012.

Yin, L et al., "SMARTMIG: Risk-Modulated Proactive Data Migration for Maximizing Storage System Utility", storageconference.org, 13 pages.

"Intelligent Data Placement and Management in Virtual Computing Environments", http:/www.bitcasa.com, 1 page. Copyright 2012.

Maitland, J., "Keeping Control Isn't Easy", Chapter 4: Cloud-Based Infrastructure, SearchCloudComputing.com, Publication Date: Oct. 2009, 17 pages.

Yin et al., SMARTMIG: Risk-Modulated Proactive Data Migration for Maximizing Storage System Utility, May 28, 2014, 15 pages.

\* cited by examiner

PREDICTIVE DATA MANAGEMENT IN A NETWORKED COMPUTING ENVIRONMENT

TECHNICAL FIELD

In general, aspects of the present invention relate to data management. Specifically, aspects of the present invention relate to predictive data management in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

When end users/consumers store files with a cloud provider, the cloud provider may decide where to store the data based on the best location according to the cloud storage architecture. As such, users may be unaware of the location of their files and/or have little input over where the files are stored. This issue may be complicated as the amount of data grows and/or when efficient or rapid access to the data needed.

SUMMARY

Embodiments of the present invention provide an approach for managing file storage between local and remote storage locations in a networked computing environment (e.g., a cloud computing environment). In a typical embodiment, files/data may be tagged with metadata that associates the files with an event that indicates a date/time and a geographical destination/location of an intended use of the files/data. The files may then be transferred between local and remote storage (e.g., at the destination) based upon a set of predefined rules for transferring the files/data.

A first aspect of the present invention provides a computer-implemented method for predictive data management in a networked computing environment, comprising: accessing a set of files of a user, the set of files being stored in at least one computer storage device of the networked computing environment; tagging the set of files with a set of metadata, the set of metadata indicating a target date and a destination of an intended use of at least one of the set of files; determining a time for transferring the set of files to a storage location that is accessible from the destination, the time and the storage location being determined based on a set of predefined rules; and transmitting the set of files to the storage location at the determined time according to the set of predefined rules.

A second aspect of the present invention provides a system for predictive data management in a networked computing environment, comprising: a memory medium comprising instructions; a bus coupled to the memory medium; and a processor coupled to the bus that when executing the instructions causes the system to: access a set of files of a user, the set of files being stored in at least one computer storage device of the networked computing environment; tag the set of files with a set of metadata, the set of metadata indicating a target date and a destination of an intended use of at least one of the set of files; determine a time for transferring the set of files to a storage location that is accessible from the destination, the time and the storage location being determined based on a set of predefined rules; and transmit the set of files to the storage location at the determined time according to the set of predefined rules.

A third aspect of the present invention provides a computer program product for predictive data management in a networked computing environment, the computer program product comprising a computer readable storage media, and program instructions stored on the computer readable storage media, to: access a set of files of a user, the set of files being stored in at least one computer storage device of the networked computing environment; tag the set of files with a set of metadata, the set of metadata indicating a target date and a destination of an intended use of at least one of the set of files; determine a time for transferring the set of files to a storage location that is accessible from the destination, the time and the storage location being determined based on a set of predefined rules; and transmit the set of files to the storage location at the determined time according to the set of predefined rules.

A fourth aspect of the present invention provides a method for deploying a system for predictive data management in a networked computing environment, comprising: providing a computer infrastructure being operable to: access a set of files of a user, the set of files being stored in at least one computer storage device of the networked computing environment; tag the set of files with a set of metadata, the set of metadata indicating a target date and a destination of an intended use of at least one of the set of files; determine a time for transferring the set of files to a storage location that is accessible from the destination, the time and the storage location being determined based on a set of predefined rules; and transmit the set of files to the storage location at the determined time according to the set of predefined rules.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
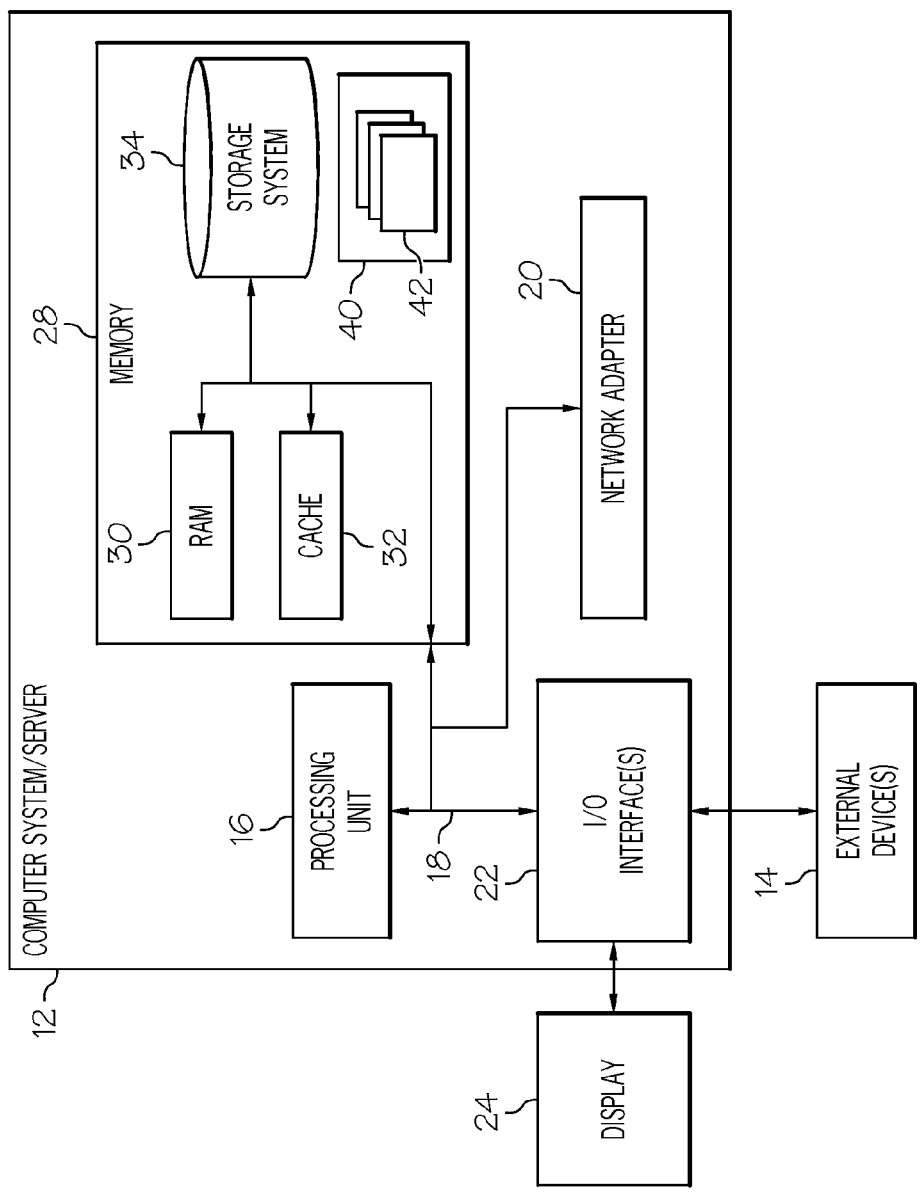
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein.

Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for managing file storage between local and remote storage locations in a networked computing environment (e.g., a cloud computing environment). In a typical embodiment, files/data may be tagged with metadata that associates the files with an event that indicates a date/time and a geographical destination/location of an intended use of the files/data. The files may then be transferred between local and remote storage (e.g., at the destination) based upon a set of predefined rules for transferring the files/data.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several 8organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
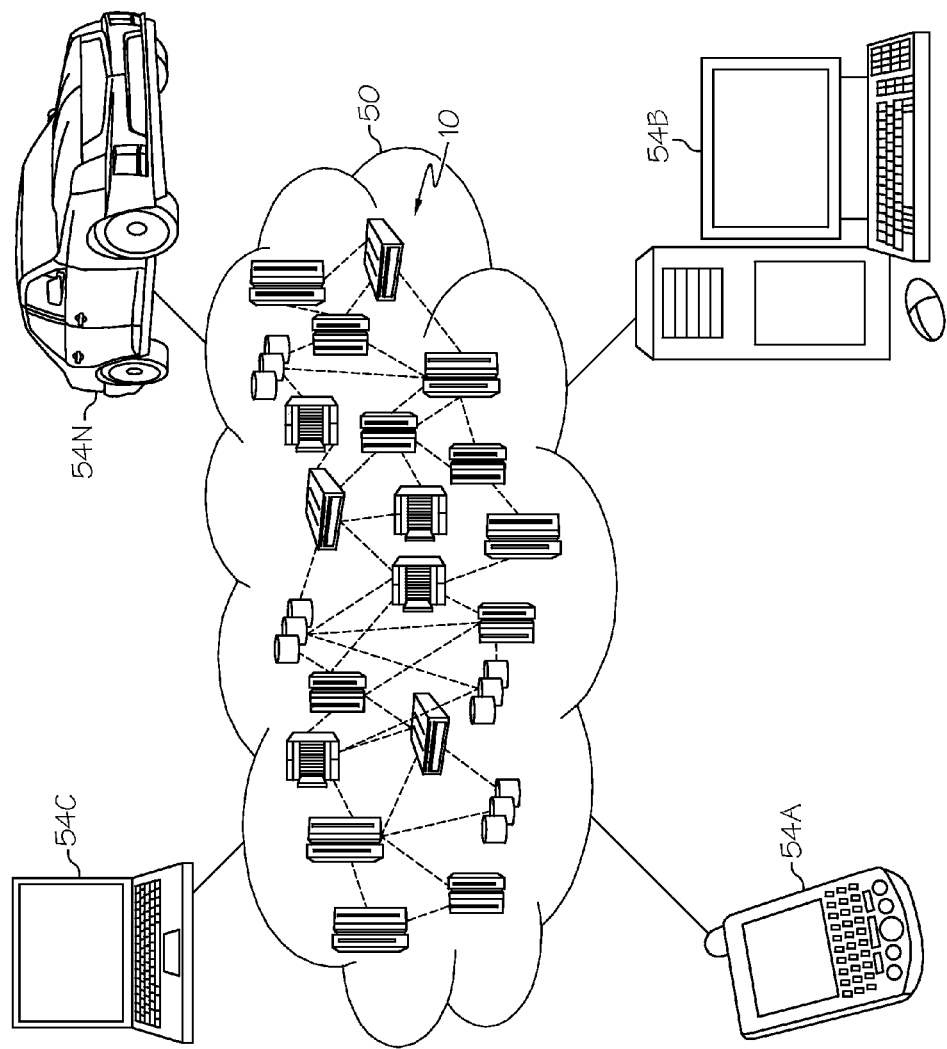
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
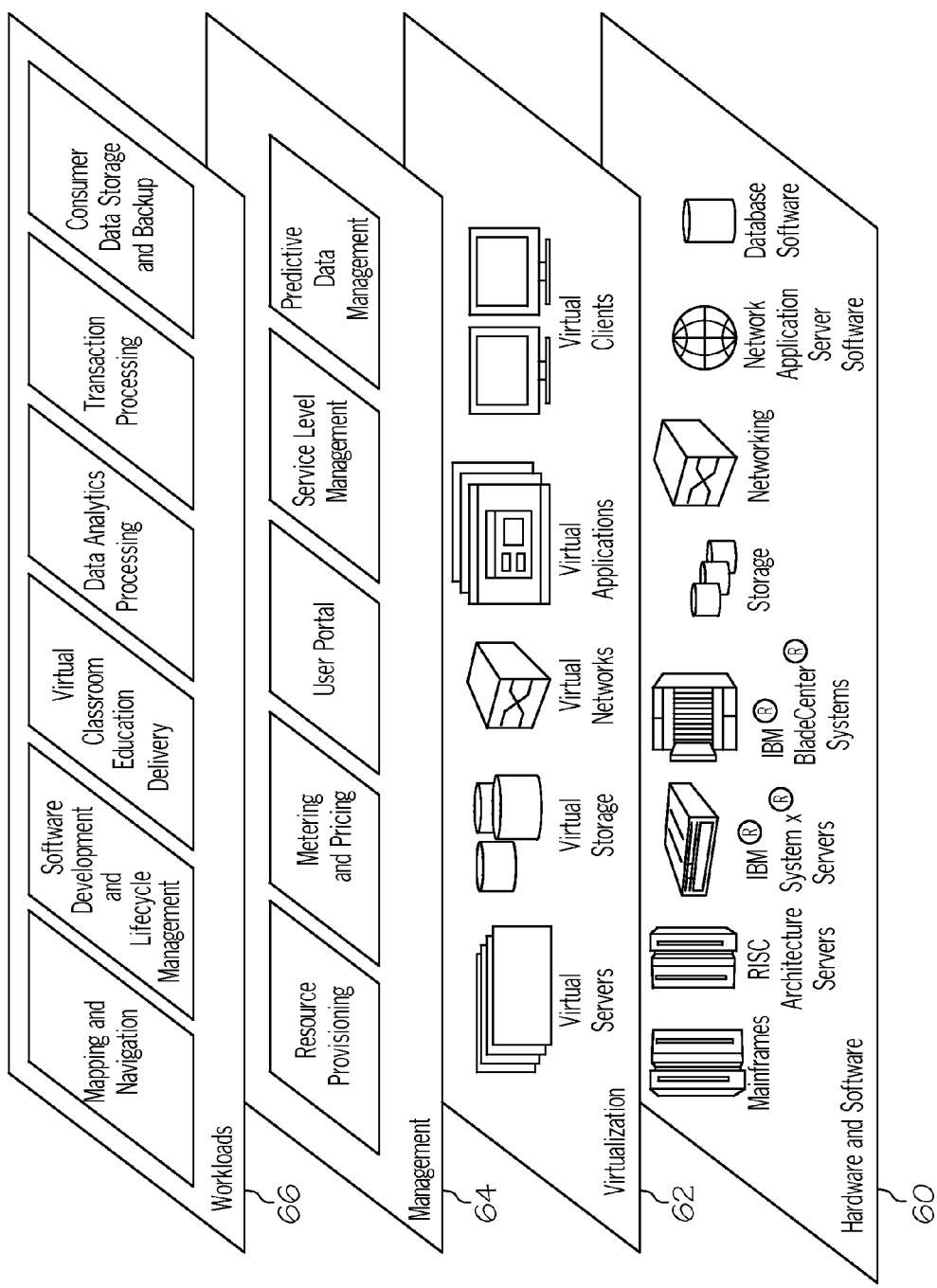
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is predictive data management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the predictive data management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
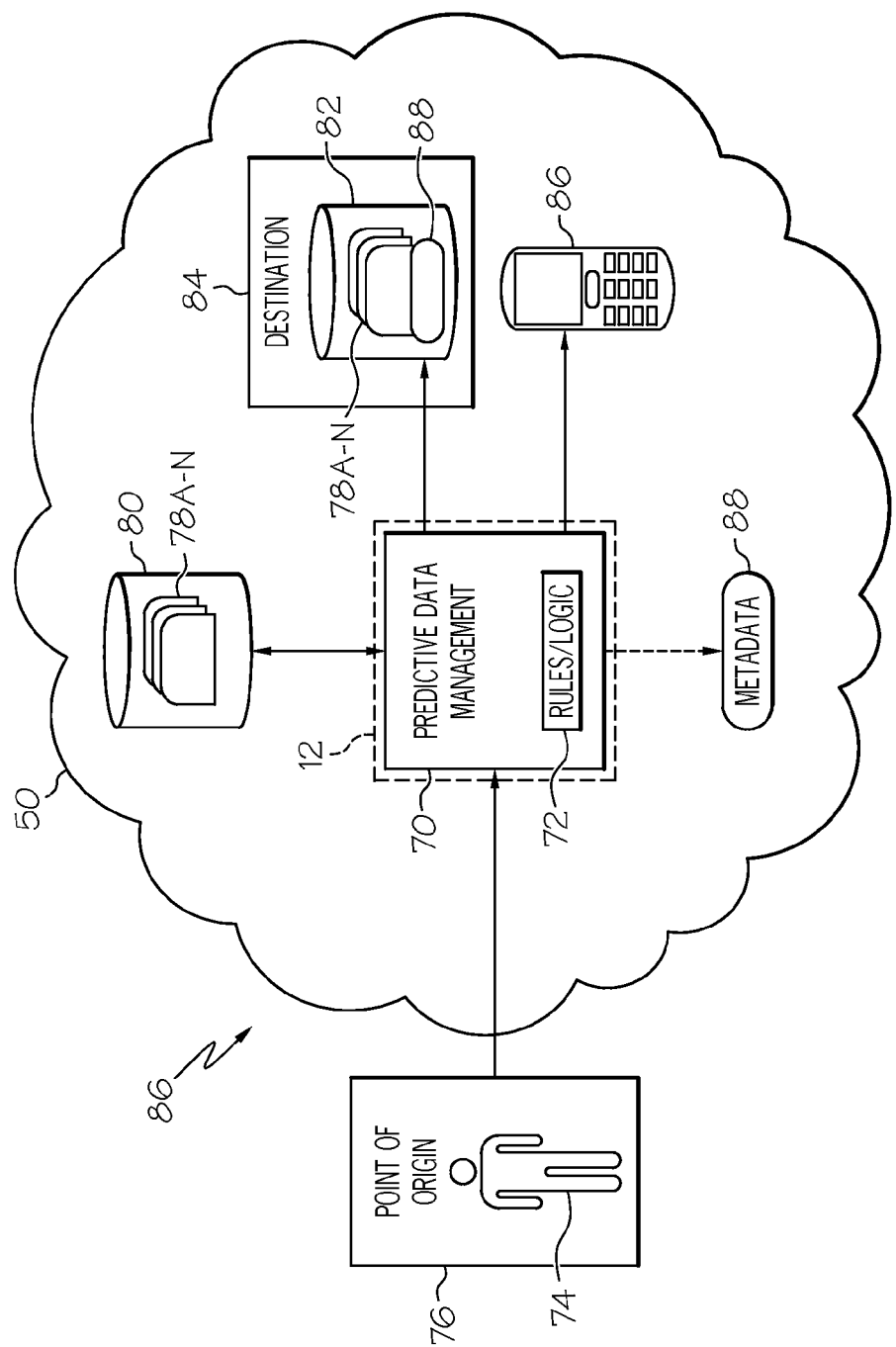
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a predictive data management engine (engine 70). Rather, engine 70 could be loaded on a server or server-capable device that communicates (e.g., wirelessly) with the clients to provide predictive data management. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides predictive data management hereunder.

Along these lines, engine 70 may perform multiple functions similar to a general-purpose computer. Specifically, among other functions, engine 70 may (among other things): access a set of files 78A-N of a user 74, the set of files 78A-N being stored in at least one computer storage device 80 of the networked computing environment 86; tag the set of files 78A-N with a set of metadata 88, the set of metadata 88 indicating a target date and a destination 84 of an intended use of at least one of the set of files 78A-N (e.g., the files may be associated with a calendar event or the like from a user's electronic calendar); determine a time for transferring the set of files 78A-N to a storage location that is accessible from the destination 84, the time and the storage location being determined based on a set of predefined rules 72 (e.g., the time and storage location being determined based on a size and a predicted transfer rate of the set of files 78A-N, a capacity of storage device(s) 82 accessible at the storage location, a proximity of storage device(s) 82 to destination 84, etc.); compare: (a) an estimated travel time for the user 74 to travel from a point of origin 76 to the destination 84 to (b) the predicted transfer rate of the set of files 78A-N (e.g., from storage device 80 to storage location/device 82); transmit the set of files 78A-N to the storage location at the determined time according to the set of predefined rules 72; commence transmission of the set of files 78A-N to the storage location after a verification has been received that the user 76 has departed from the point of origin 76 to the destination 84 (e.g., responsive to the predicted transfer rate of the set of files 78A-N being less than the estimate travel time of the user 74); and/or to transmit the set of files 78A-N (e.g., temporarily) to a mobile device 86 utilized by the user 74.

Illustrative Scenarios

Figure 5:
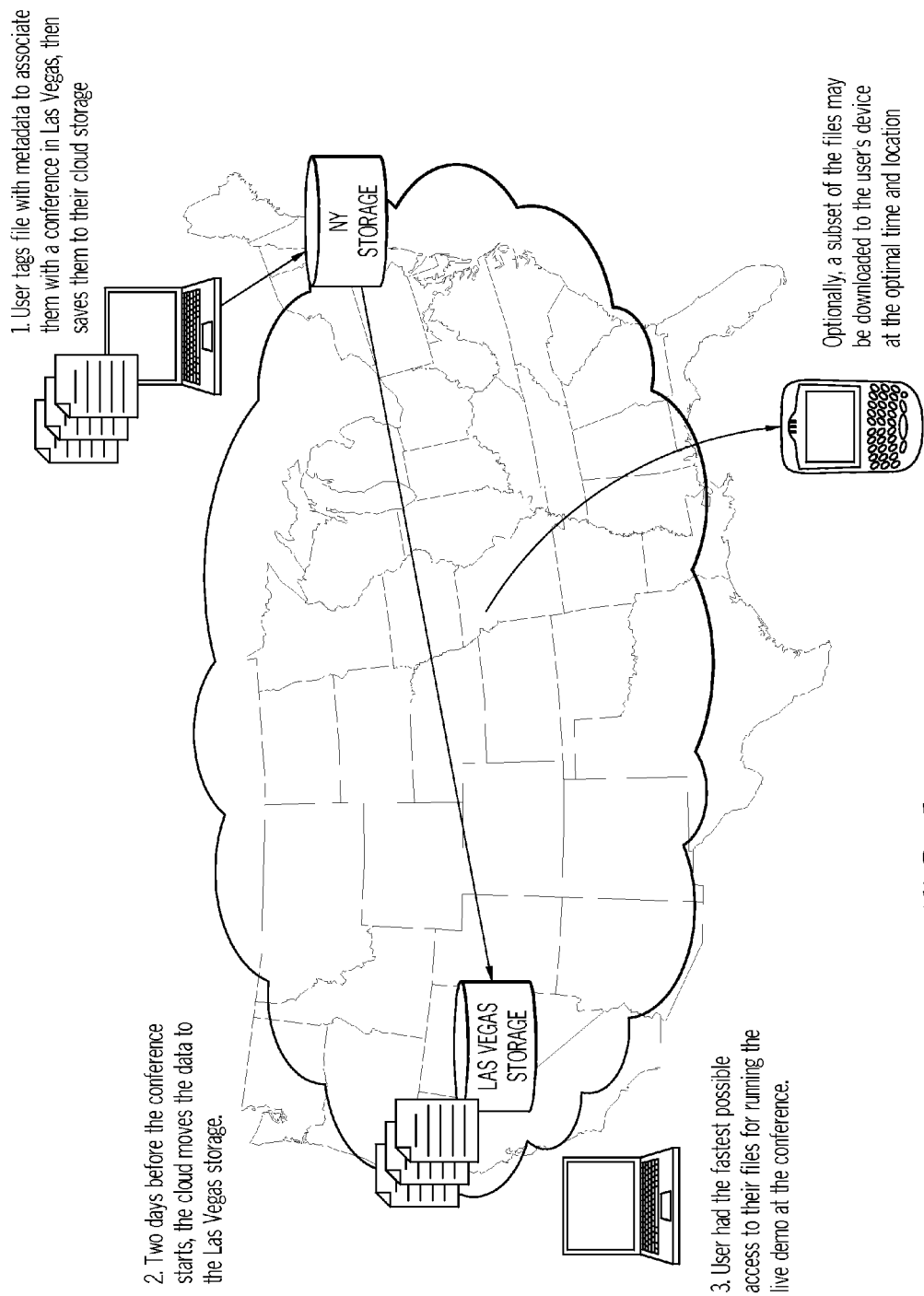
FIG. 5 depicts a diagram illustrative example according to an embodiment of the present invention.

Referring now to FIG. 5, an illustrative example is shown. In this example, assume that a user plans to attend a conference (e.g., in Las Vegas, Nev.) and give a live product demonstration. As such, fast access to the user's files is needed. In accordance with the teachings described above, the user may associate certain files with the event by tagging them with metadata. This associates the files to the dates and location of the conference. Some period of time prior to the conference's start date, the files and their associated metadata may be transferred to an optimal local cloud storage location in the city of the conference. Optionally, the user may specify a subset of the files to be downloaded to his mobile device (e.g., laptop or smart phone). For example, the user may know that he/she may stop at an airport in Atlanta on his way to Las Vegas, and high speed free internet access will be available to the user there. As such, the user may choose to download the files at that location. Further, after the conference is over, the cloud may transfer the files to another location for long term storage.

In any event, the steps involved with this (and other illustrative examples) may occur as follows:
1. The user creates a set of files.
2. The user tags the set of files with metadata to associate them with a particular venue or project. This may be done by associating them with a calendar event, or manually tagging them and entering date, time, and location.
   a. A cloud server reads the metadata associated with the files.
3. Rules may be established for determining when and where to move data based on the venue. (See below for additional details.)
4. Data may be proactively moved at a time prior to the venue to the optimum cloud storage site near where the user will need the data.
5. Optionally, a subset of the data may be moved to the user's device according to the venue rules (e.g., when the user arrives in a location, or a data and time are reached).
   a. If all the locations that the user will be located are known, all such locations between the user's starting point (point of origin) and destination may be evaluated.
   b. A subset of the files that the user prefers to have on his local device may be downloaded at a most optimal location (e.g., based on network speed, cost to download, etc.) to make sure they arrive in time.
6. Optionally, after the venue is over, files may be transferred to another cloud location.
   a. The cloud server may move the files back to the original cloud server, or any other location that works well for the user's usual location for ongoing use.

As indicated above, a set of predefined rules may be utilized hereunder. The rules may be based on the data the user needs, when the user needs data, and/or when the data can be delivered. For example, assume in another scenario that user "A" at his/her company office in Raleigh, N.C., has completed an analytics presentation that includes several large datasets for a combined size 200 terabytes. Further assume that user "A" needs to access this data at a data rate of 2 GB/second to present an effective presentation. Still yet, assume that user "A" needs to travel to Las Vegas on February 4th to show the presentation to a business executive. Accessing this amount of data remotely may not provide the data rate user "A" requires. Hosting the data on a server within the presentation venue may provide user "A" with both the space required, as well as the data rate required to transfer the data to user "A's" presentation machine. Along these lines, the predefined rules for this example may functions as follows:
1. Determine target presentation day at presentation venue.
2. Determine available servers at presentation venue that contain enough capacity to temporarily hold user "A's" data set package (DSP). Select best server "A" based on availability and cost to hold DSP.
3. Determine available data network paths between server "A" and venue presentation room. Select best path P1, based on required data rate and cost from server to presentation room.
4. Calculate transfer time to transmit DSP from Raleigh to Las Vegas presentation venue based on size and available data rates.
5. If transfer time is less than user "A's" travel time, begin transfer of data to venue server "A" upon verification from one of user "A's" airline, user "A's" calendar, or user "A's" social network status that user "A" has begun trip to Las Vegas.
6. If transfer time is greater than travel time, schedule transfer start in advance to allow time for data to be transmitted.
7. Notify user "A" of availability of data server pages (DSP) on server "A" via path P1 once transfer is complete.
8. User "A" gives presentation.
9. User "A" notifies system data is no longer needed, and server "A" purges DSP and releases path P1.

It is further understood that the metadata tagged to files or the like may take various types of structure. One possible embodiment for the structure of the metadata may be:
Venue Object
  Location
  Owner
  Users: User(s) that need access to the files in this venue
  Start date
  Start time
  Lead time: An amount of time in advance of an event that the data may be moved to the new location. A presenter may be arriving a day early to rehearse which may lead the presenter to request a 48 hour lead time.
  End date
  End time
  File size
  Associated Files: List of other files that need to stay in proximity to this file
  Collection Size: Size of entire collection of files that need to stay together
  Duplication Allowed: If multiple venues overlap in time, duplication may be allowed in order to optimize performance at each venue.
Tour Object
  Venue 1
  Venue 2
  Venue 3
User Scenario #1—Serial Tour:
1. A team is going on a tour that will include 5 days in Las Vegas, followed by 2 days in Houston, then 7 days in Australia and will need data to be stored at a location that will provide fast access thereto.
2. The team tags the necessary files with metadata about their tour by associating the team members with their electronic calendars.
3. The cloud service provider file management application evaluates options for moving the data. Options include:
   a. Move the data to the data center in Las Vegas while the team is there, then move to the center in Dallas (closest data center) while the team is in Houston.
   b. Move the data to the data center in Denver for the entire time (method will use the duplication allowed tag in the metadata to help in this decision process).
4. Considering the network speeds, availability and performance of servers and storage in each location, cost of data storage, etc., the system may select the best plan for data relocation during the US venues.
5. The data is moved to Australia for the duration of time that the team will be there.
6. After the Australia trip is over, the data is relocated back to the New York data center near the permanent location for the users.

User Scenario #2—Parallel Tour:
1. Two teams are going on a tour. One team is going to San Francisco and the other to Phoenix.
2. Each team tags files that they will need for their venues.
3. A subset of the files happened to be tagged by multiple users for the two venues that occur at the same time in the different locations.
4. The system has the following options:
   1. Store the files at the Los Angeles data center between the two locations. This data center is small and access is not likely to be very fast.
   2. Store the files at a San Diego data center that is hosted by another provider. Pay the provider a fee for temporary access.
   3. Store the files at the San Francisco data center. Given that there is a conference there that week, access and storage availability may be small.
   4. Store the files at the Phoenix data center. This is a large and major center, so access will be fast, even to San Francisco.
5. The access server determines the best option balancing the needs of the multiple users.

User Scenario #3—Parallel Tour with Duplication:
1. Two teams are going on a tour. One team is going to San Francisco, Calif., and the other to Frankfurt, Germany.
2. Each team tags files that they will need for their venues.
3. A subset of the files happened to be tagged by multiple users for venues that occur at the same time in the different locations.
4. Given that the locations are so far apart, a common data center between them may not provide fast access:
   a. Duplicate the files if the metadata tag allows it. Store a copy in both San Francisco and Frankfurt.
      1. Optionally mark one copy as read only and redirect changes to the master copy.
      2. Optionally allow both copies to be forked and edited independently.
   b. When the tour is complete, evaluate both duplicates and merge them if possible, or move both back to New York and flag the conflict and notify the owner identified in the metadata if needed.

Figure 6:
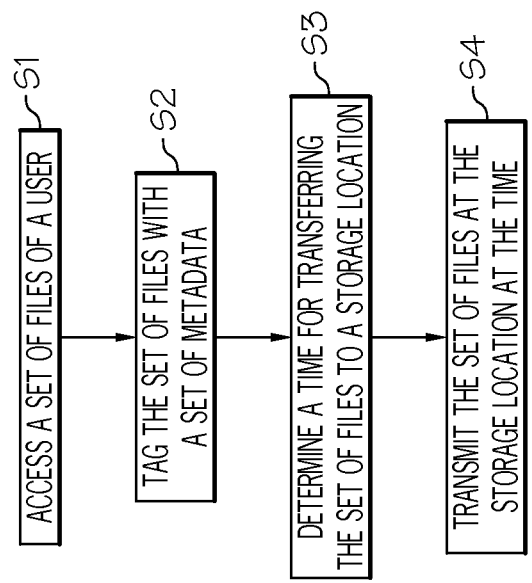
FIG. 6 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 6, a method flow diagram according to an embodiment of the present invention is shown. In step S1, a set of files of a user is accessed. The set of files may be stored in at least one computer storage device of the networked computing environment. In step S2, the set of files are tagged with a set of metadata. The set of metadata may indicate a target date and a destination of an intended use of at least one of the set of files. In step S3, a time for transferring the set of files to a storage location that is accessible from the destination is determined. The time and the storage location may be determined based on a set of predefined rules. In step S4, the set of files may be transmitted to the storage location at the determined time according to the set of predefined rules.

While shown and described herein as a predictive data management solution, it is understood that the invention further provides various alternative embodiments. For example, in one embodiment, the invention provides a computer-readable/useable medium that includes computer program code to enable a computer infrastructure to provide predictive data management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide predictive data management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for predictive data management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for predictive data management in a networked computing environment, comprising:
   accessing a set of files of a user, the set of files being stored in at least one computer storage device of the networked computing environment;
   tagging the set of files with a set of metadata, the set of metadata indicating a target date and a destination of an intended use of at least one of the set of files;
   determining a time for transferring the set of files to a storage location that is accessible from the destination, the time and the storage location being determined based on a set of predefined rules and on a size and a predicted transfer rate of the set of files, the time being further determined based on a comparison of: (a) an estimated travel time for the user to travel from a point of origin to the destination to (b) the predicted transfer rate of the set of files; and
   transmitting the set of files to the storage location at the determined time according to the set of predefined rules.

2. The computer-implemented method of claim 1, responsive to the predicted transfer rate of the set of files being less than the estimated travel time of the user, the transmission of the set of files to the storage location commencing after a verification has been received that the user has departed from the point of origin to the destination.

3. The computer-implemented method of claim 1, the storage location being determined based on a capacity of a set of storage devices associated with the storage location and a proximity of the storage location to the destination.

4. The computer-implemented method of claim 1, further comprising transmitting the set of files to a mobile device utilized by the user.

5. The computer-implemented method of claim 1, the networked computing environment comprising a cloud computing device, and the storage location comprising at least one cloud storage device.

6. A system for predictive data management in a networked computing environment, comprising:
   a memory device comprising instructions;
   a bus coupled to the memory device; and
   a processor coupled to the bus that when executing the instructions causes the system to:
      access a set of files of a user, the set of files being stored in at least one computer storage device of the networked computing environment;
      tag the set of files with a set of metadata, the set of metadata indicating a target date and a destination of an intended use of at least one of the set of files;
      determine a time for transferring the set of files to a storage location that is accessible from the destination, the time and the storage location being determined based on a set of predefined rules and on a size and a predicted transfer rate of the set of files, the time being further determined based on of: (a) an estimated travel time for the user to travel from a point of origin to the destination to (b) the predicted transfer rate of the set of files; and
      transmit the set of files to the storage location at the determined time according to the set of predefined rules.

7. The system of claim 6, the memory device further comprising instructions for causing the system to, responsive to the predicted transfer rate of the set of files being less than the estimated travel time of the user, commence the transmission of the set of files to the storage location after a verification has been received that the user has departed from the point of origin to the destination.

8. The system of claim 6, the storage location being determined based on a capacity of a set of storage devices associated with the storage location and a proximity of the storage location to the destination.

9. The system of claim 6, the memory device further comprising instructions for causing the system to transmit the set of files to a mobile device utilized by the user.

10. The system of claim 6, the networked computing environment comprising a cloud computing device, and the storage location comprising at least one cloud storage device.

11. A computer program product for predictive data management in a networked computing environment, the computer program product comprising a computer readable storage device, and program instructions stored on the computer readable storage media, to:
   access a set of files of a user, the set of files being stored in at least one computer storage device of the networked computing environment;
   tag the set of files with a set of metadata, the set of metadata indicating a target date and a destination of an intended use of at least one of the set of files;
   determine a time for transferring the set of files to a storage location that is accessible from the destination, the time and the storage location being determined based on a set of predefined rules and on a size and a predicted transfer rate of the set of files, the time being further determined based on a comparison of: (a) an estimated travel time for the user to travel from a point of origin to the destination to (b) the predicted transfer rate of the set of files; and
   transmit the set of files to the storage location at the determined time according to the set of predefined rules.

12. The computer program product of claim 11, the computer-readable storage device further comprising instructions to, responsive to the predicted transfer rate of the set of files being less than the estimated travel time of the user, commence the transmission of the set of files to the storage location after a verification has been received that the user has departed from the point of origin of the destination.

13. The computer program product of claim 11, the storage location being determined based on a capacity of a set of storage devices associated with the storage location and a proximity of the storage location to the destination.

14. The computer program product of claim 11, the computer readable storage device further comprising instructions to transmit the set of files to a mobile device utilized by the user.

15. The computer readable storage device of claim 11, the networked computing environment comprising a cloud computing device, and the storage location comprising at least one cloud storage device.

16. A method for deploying a system for predictive data management in a networked computing environment, comprising:
provides a computer infrastructure being operable to:
- access a set of files of a user, the set of files being stored in at least one computer storage device of the networked computing environment;
- tag the set of files with a set of metadata, the set of metadata indicating a target date and a destination of an intended use of at least one of the set of files;
- determine a time for transferring the set of files to a storage location that is accessible from the destination, the time and the storage location being determined based on a set of predefined rules and on a size and a predicted transfer rate of the set of files, the time being further determined based on a comparison of: (a) an estimated travel time for the user to travel from a point of origin to the destination to (b) the predicted transfer rate of the set of files; and
- transmit the set of files to the storage location at the determined time according to the set of predefined rules.

* * * * *